Patented May 10, 1949

2,469,663

UNITED STATES PATENT OFFICE 2,469,663

PROCESS FOR PRODUCING METAL PHTHALOCYANINES AND THEIR DERIVATIVES

Frank H. Moser, Huntington, W. Va., assignor to The Standard Ultramarine Company, Huntington, W. Va., a corporation of West Virginia No Drawing. Application September 20, 1946, Serial No. 698,404

8 Claims. (Cl. 260—314.5)

1

This invention relates to an improved process for producing coloring matter in the form of metal phthalocyanines and their derivatives.

It is the purpose and object of this invention to provide a process for the production of metal phthalocyanines and their derivatives of high quality from the free metal and other readily available source materials.

Through the medium of the present invention it is possible to produce metal phthalocyanines starting with the free metal as the metal reactant and by employing much lower temperatures than ordinarily resorted to in the production of these products.

The production of metal phthalocyanines starting with the free metal and with such reactants as phthalic anhydride or phthalimide or other ortho-phthalic acid derivative, cannot be accomplished through any known prior art procedures without the employment of excessively high temperatures which result in the formation of colors that are contaminated, dirty, and commercially unsatisfactory.

Through the employment of the process of the present invention, it is possible to produce metal phthalocyanines and their derivatives directly from the free metal and an ortho-phthalic acid compound at temperatures sufficiently low to produce a color material of excellent quality, and in yields considerably better than obtained through prior art procedures.

Generally speaking, the method of the present invention consists in heating a free powdered metal selected from the group consisting of copper, nickel, tin, and cobalt, with a compound selected from the group consisting of ortho-dicarboxylic acid, the ammonium salts of ortho-dicarboxylic acid, the amides, imides, imimides, and anhydrides of ortho-dicarboxylic acid, ortho-cyanocarboxylic acid, the ammonium salts of ortho-cyanocarboxylic acid, and the amides of ortho-cyanocarboxylic acid, with urea in the presence of certain selected oxidizing agents and a catalyst for the reaction.

Oxidizing agents suitable for employment in practicing the method are those selected from the group consisting of persulfates, perchlorates, chlorates, bromates, iodates, arsenates, permanganates, and arsenic oxides. Of these oxidizing agents, ammonium perchlorate, ammonium persulfate, sodium chlorate, and potassium permanganate have been found to be particularly effective.

In order to obtain any substantial yield, indeed in order to obtain a yield of more than 5% of the

2 color material. I have found it essential to employ a catalyst for the reaction. Appropriate catalysts for use in carrying out the process are those selected from the group consisting of molybdenum metal, compounds of molybdenum; chlorides, oxychlorides, and acetates of zirconium; chlorides of titanium, lead, zinc, tin, and aluminum; compounds of phosphorus, vanadium, arsenic, selenium, antimony, tungsten, and bismuth. Of these catalysts, zirconium tetrachloride, ammonium molybdate, molybdenum metal, molybdic oxide, zirconium oxychloride, and titanium tetrachloride have been found to possess particularly effective catalytic properties for the reaction.

It is impossible to state just what is the precise mechanism of the reaction that occurs in the process. The product resulting from the practice of the process, however, is a high quality, commercially satisfactory, coloring material, and the yields obtained are superior to those of prior art procedures based on the employment of ortho-phthalic acid or a derivative or equivalent thereof as one of the starting materials.

The present process has the further advantage that it can be conducted in a liquid medium rather than in a melt, so that very accurate control of the temperature conditions can be maintained. The process may be operated at such a low temperature that steam-heated equipment, using steam pressures of only 125 to 150 pounds, may be employed. The process of the subject invention may be carried out at a temperature within the range of about 150° C. to about 200° C.

Normally, it is found advantageous to introduce the reactants, the oxidizing agent, and the catalyst, into an appropriate liquid medium which is inert under the conditions of the reaction. The reactants should be introduced into the liquid reaction medium in finely divided form. Inert solvents such as trichlorobenzene, chlorophthalene, naphthalene, and comparable inert petroleum solvents are suitable for use as the liquid reaction medium in the practice of the process.

When the process is carried out through the use of a liquid reaction medium, the temperature conditions are preferably maintained within the limits of about 175° C. to about 190° C. Temperatures of the order of 180° C. to 185° C. have been found particularly advantageous. When the process is carried out in the absence of a liquid reaction medium, i. e. in a melt, a somewhat higher temperature range of the order of 190° C. to 195° C. may be employed.

It will be appreciated that care should be taken in mixing such oxidizing agents as ammonium perchlorate with the powdered metal and the other organic compounds to avoid the hazards of explosion.

The following examples, in which the parts indicated are by weight, are given as illustrative of the invention and are not to be construed as in limitation thereof.

*Example I*

100 parts of finely powdered phathalic anhydride, 150 parts of ground urea, 12.5 parts copper powder (100% 325 mesh), 10 parts zirconium tetrachloride and 10 parts ammonium perchlorate are added to 600 parts of chloronaphthalene. The mixture is agitated and heated to 175–180° C. for four hours. The mixture is then cooled to 150° C.; the product is filtered and washed free of chloronaphthalene with alcohol; the chloronaphthalene remaining in the cake may be removed by steam distillation. The product is slurried with 2000 parts of water and sufficient sodium hydroxide to make the water alkaline to phenolphthalein, and heated to the boiling point for ten minutes. The product is then again filtered and washed until alkaline free. The resulting copper phthalocyanine is slurried with 2000 parts of water again and sufficient hydrochloric acid added to make the resulting solution acid to a pH of from 0.5 to 2.0. The slurry is boiled for 30 minutes and then filtered and the cake washed until acid free. When dried, the resulting color represented a yield of 91–93 parts of copper phthalocyanine. A similar yield can be obtained by replacing the zirconium tetrachloride with any of the following: 0.5 part of ammonium molybdate, 1.0 part of powdered molybdenum metal, 0.5 part of molybdic oxide, or 12 parts of zirconium oxychloride. Similar results can also be obtained by replacing the 100 parts of phthalic anhydride with any of the following: 111 parts of phthalamide, 100 parts of phthalimide, 133 parts of ammonium phthalate, 112 parts of o-phthalic acid, 99 parts of phthalimimide or 99 parts of o-cyanobenzamide.

*Example II*

A powdered mixture of 40 parts urea, 25 parts 3-nitrophthalic anhydride, 2 parts ammonium perchlorate, 0.25 part molybdenum oxide, and 2 parts copper powder, is added to 250 parts of chloronaphthalene. The mixture is agitated and heated to 180–185° C. for four hours. It is then cooled to 120° C. and filtered. The product is washed with alcohol to remove the chloronaphthalene, and then dried. The product is a 3-nitrophthalocyanine copper complex.

*Example III*

100 parts powdered phthalic anhydride, 150 parts urea, 21 parts powdered ammonium persulfate, 12.5 parts copper powder, and 12 parts zirconium oxychloride, are added to 600 parts of chloronaphthalene. The mixture is agitated and heated to 180–185° C. for four hours. The product is separated from the chloronaphthalene and treated with sodium hydroxide solution and dilute hydrochloric acid solution as in Example I. A substantial yield of copper phthalocyanine is obtained.

123 parts powdered 4-chlorophthalic anhydride, 150 parts powdered urea, 12 parts powdered zirconium tetrachloride, 12.5 parts copper powder (100% 325 mesh), and 10 parts of powdered ammonium perchlorate are thoroughly mixed. The mixture is then added to 700 parts of trichlorobenzene. The slurry is agitated and heated to 150° C. during about 1 hour, and then further heated from 150 to 180° C. during an additional hour, and thereafter kept at a temperature of 180–185° C. for four hours. The product is filtered and washed with isopropanol to remove the trichlorobenzene. The product may be slurried with 10–50% sulfuric acid to remove any zirconium hydroxide present. When the product is washed acid free and dried an almost theoretical yield of tetrachlorophthalocyanine is obtained. If, in place of the 123 parts of 4-chlorophthalic anhydride, 122 parts of 4-chlorphthalalimide are used, similar results are obtained.

*Example IV*

50 parts powdered phthalic anhydride, 75 parts urea, 5 parts powdered zirconium tetrachloride, 6.25 parts copper powder, and 5.2 parts powdered sodium chlorate, are added to 300 parts of chloronaphthalene. The mixture is agitated and carefully heated to 180–185° C. for four hours. The chloronaphthalene is removed, and the product is treated with sodium hydroxide solution and hydrochloric acid solution as in Example I. A substantial yield of copper phthalocyanine is produced. Copper phthalocyanine can also be produced by replacing the 5.2 parts of sodium chlorate with any of the following: 12 parts of potassium iodate, 20 parts of arsenic oxide, or 8 parts of potassium bromate.

*Example V*

50 parts of powdered phthalic anhydride, 75 parts of urea, 0.5 part of molybdic oxide, 4.25 parts of potassium permanganate, and 6.25 parts of powdered copper, are added to 300 parts of chloronaphthalene. The mixture is agitated and heated to 175–180° C. for four hours. It is then filtered to remove the cholornaphthalene, the product is washed with alcohol, and treated wtih dilute sodium hydroxide solution and with dilute hydrochloric acid solution as in Example I. A substantial yield of copper phthalocyanine results.

75 parts of powdered ammonium salt of sulfonated phthalic acid, 75 parts urea, 5.5 parts copper powder (100% through a 325 mesh screen), 20.0 parts zirconium tetrachloride, and 4.25 parts ammonium perchlorate are thoroughly mixed. The mixture is added to 600 parts of trichlorobenzene. The whole is heated to 150° C. during one hour, then from 150° C. to 175° C. during an additional hour, and thereafter kept at a temperature of 175–180° C. for two hours. Then filter or decant the solvent. Dissolve the product in sodium hydroxide solution, filter, and salt it out, or adjust the pH of the solution and convert it directly to the barium lake. The insoluble portion left on solution of the sodium phthalocyanine sulfonate is the zirconium lake and it may also be used as a pigment. An excellent over-all yield of sodium phthalocyanine sulfonate and zirconium lake is obtained.

150 parts powdered urea, 100 parts powdered phthalic anhydride, 12.5 parts powdered copper, 10 parts powdered zirconium tetrachloride, and 20 parts powdered ammonium nitrate are thoroughly mixed. The mixture is added to 700 parts trichlorobenzene. The mixture is then heated to 175° C. during one hour and the temperature maintained at 175–180° for four hours. The product is filtered and worked up as described in Example I.

Example VI 150 parts ground urea, 100 parts powdered phthalic anhydride, 10 parts ammonium perchlorate, and 12.5 parts of copper powder (325 mesh), are added to 600 parts of chloronaphthalene. The mixture is agitated and heated to 180° C. in about an hour, and held at a temperature of 180-185° C. for four hours. It is then slightly cooled and filtered to remove the chloronaphthalene, and the product treated with sodium hydroxide solution and hydrochloric acid solution, as in Example I. A yield of 95 parts of copper phthalocyanine is produced. In the foregoing procedure titanium tetrachloride was used as the catalyst in an amount within the range set forth in the first paragraph after Example VII. When, as an example, stannic chloride is used as a catalyst to make copper phthalocyanine by the above procedure, the product contains the correct amount of copper and no tin.

Example VII

In this example, the metal phthalocyanine is produced without the use of a solvent. There are thoroughly mixed 300 parts powdered urea, 200 parts powdered phthalic anhydride, 10 parts powdered ammonium perchlorate, 22.5 parts powdered copper (325 mesh), 1.0 part ammonium molybdate. This mixture is heated in a copper or enameled vessel to 190-195° C. for 2 hours. A yield of 160 to 165 parts of copper phthalocyanine is produced, and may be isolated by grinding the cooled product, treating it with dilute sodium hydroxide solution and later with dilute hydrochloric acid solution according to the method given in Example I.

The quantity of the catalyst required may vary somewhat, depending upon the particular compounds or elements chosen for use in the process. However, generally speaking, the amount of the catalyst should be maintained within the limits of 0.0005% and 3.0%, based on the weight of the total mixture.

In general, it is advisable to employ the reactants in the proportion of four moles of phthalic anhydride or phthalimide or other ortho-phthalic acid derivative to 1 to 1.1 moles of the selected metal powder to two to four equivalents of the selected oxidizing agent. The quantity of urea used should be from one to one and one-half times the weight of the phthalic anhydride or phthalamide or other ortho-phthalic acid derivative. For instance, in Example I, the materials were employed in the ratio of four moles of phthalic anhydride to 1.1 moles of copper powder to four equivalents of ammonium perchlorate. (The equivalent weight of ammonium perchlorate is one-eighth its molecular weight.) The ratio of urea to phthalic anhydride was 1.5 to 1. I have found from experience that the reaction mixture should not be heated too rapidly and that for good yields the time period for raising the reaction mixture from about 100° C. to the reaction temperature, usually about 180° C., should be about forty-five minutes.

I am familiar with several prior art procedures for producing metal phthalocyanines, such as copper phthalocyanine. However, in the prior art procedures, it is impossible to obtain a satisfactory coloring material starting with the free metal. Furthermore, the temperatures employed in the prior art procedures, even starting with a compound of the metal, are usually substantially higher than the temperature conditions found effective in carrying out the process of my invention and no comparable yields are obtained employing the low temperatures appropriate for my process. It will thus be apparent that the present invention provides a highly advantageous process for the direct production, in substantial yield, of metal phthalocyanines and their derivatives from the free metal under relatively low temperature conditions.

Having thus described my invention, what I claim is:

1. A method of producing copper phthalocyanine pigments which comprises heating to a temperature within the range of from about 150° C. to about 200° C. a mixture of powdered metallic copper, urea, a catalyst, an oxidizing agent, and a compound selected from the group consisting of orthodicarboxylic acids, the ammonium salts, amides, imides, and anhydrides of such acids and the amides of orthocyanocarboxylic acids; said oxidizing agent being utilized in an amount sufficient to provide at least 0.5 chemical equivalent thereof per mol of said compound.

2. A method of producing copper phthalocyanine pigments which comprises heating to a temperature within the range of from about 150° C. to about 200° C. a mixture of powdered metallic copper, urea, a catalyst, a solid oxidizing agent and a compound selected from the group consisting of orthodicarboxylic acids, the ammonium salts, amides, imides, and anhydrides of such acids and the amides of orthocyanocarboxylic acids; said oxidizing agent being utilized in an amount sufficient to provide at least 0.5 chemical equivalent thereof per mol of said compound.

3. A method of producing copper phthalocyanine pigments which comprises heating to a temperature within the range of from about 150° C. to about 200° C. in a nonreactive liquid medium a mixture of powdered metallic copper, urea, a catalyst, an oxidizing agent and a compound selected from the group consisting of orthodicarboxylic acids, the ammonium salts, amides, imides, and anhydrides of such acids and the amides of orthocyanocarboxylic acids; said oxidizing agent being utilized in an amount sufficient to provide at least 0.5 chemical equivalent thereof per mol of said compound.

4. The process of claim 1 wherein the oxidizing agent is ammonium persulfate.

5. The process of claim 1 wherein the oxidizing agent is sodium chlorate.

6. The process of claim 1 wherein the catalyst is zirconium tetrachloride.

7. The process of claim 1 wherein the catalyst is titanium tetrachloride.

8. The process of claim 1 wherein the catalyst is molybdic oxide.

FRANK H. MOSER.

REFERENCES CITED

The following references are of record in the file of this patent:

UNITED STATES PATENTS

| Number | Name | Date |
| --- | --- | --- |
| 2,342,662 | Haddock | Feb. 29, 1944 |
| 2,410,301 | O'Neal | Oct. 29, 1946 |

FOREIGN PATENTS

| Number | Country | Date |
| --- | --- | --- |
| 464,126 | Great Britain | Apr. 12, 1937 |
| 464,673 | Great Britain | Apr. 22, 1937 |
| 476,243 | Great Britain | Dec. 6, 1937 |